US011211095B1

(12) United States Patent
Verbeke et al.

(10) Patent No.: US 11,211,095 B1
(45) Date of Patent: Dec. 28, 2021

(54) MODIFYING MEDIA CONTENT PLAYBACK BASED ON USER MENTAL STATE

(71) Applicant: HARMAN INTERNATIONAL INDUSTRIES, INCORPORATED, Stamford, CT (US)

(72) Inventors: Joseph Verbeke, San Francisco, CA (US); Sven Kratz, Saratoga, CA (US); Adam Boulanger, Palo Alto, CA (US); Priya Seshadri, Stamford, CT (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/907,096

(22) Filed: Jun. 19, 2020

(51) Int. Cl.
*G11B 27/00* (2006.01)
*H04N 21/442* (2011.01)

(52) U.S. Cl.
CPC ..... *G11B 27/005* (2013.01); *H04N 21/44213* (2013.01)

(58) Field of Classification Search
CPC .......................... G11B 27/005; H04N 21/44213
See application file for complete search history.

(56) References Cited

U.S. PATENT DOCUMENTS

| | | | |
|---|---|---|---|
| 10,205,988 B1 * | 2/2019 | Waterman | H04N 21/4751 |
| 10,762,928 B1 * | 9/2020 | Camus | H04N 21/42201 |
| 2004/0183749 A1 * | 9/2004 | Vertegaal | G06F 3/013 |
| | | | 345/7 |
| 2009/0138507 A1 * | 5/2009 | Burckart | G11B 27/105 |
| 2017/0223413 A1 * | 8/2017 | Kozloski | H04N 21/252 |
| 2018/0009442 A1 | 1/2018 | Spasojevic et al. | |
| 2020/0164746 A1 | 5/2020 | Rekapalli et al. | |
| 2020/0304868 A1 * | 9/2020 | Ganjam | H04N 21/25808 |

OTHER PUBLICATIONS

Shi et al., "Galvanic Skin Response (GSR) as an Index of Cognitive Load", CHI 2007, Apr. 28-May 3, 2007, San Jose, California, USA, 6 pages.
Antrobus et al., "Eye Movements Accompanying Daydreaming, Visual Imagery, and Though Suppression", Journal of Abnormal and Social Psychology, 1964, vol. 69, No. 3, 244-252, 9 pages.
Cinaz et al., "Monitoring of Mental Workload Levels", IADIS International Conference e-Health 2010, 5 pages.
Grassmann et al., "Respiratory Changes in Response to Cognitive Load: A Systematic Review", Hindawi Publishing Corporation, Neural Plasticity, vol. 2 016, Article ID 8146809, http://dx.doi.org/10.1155/2016/8146809, 17 pages.
Braboszcz et al., "Lost in thoughts: Nerual markers of low alertness during mind wandering", Article in Neuroimage—Oct. 2010, DOI: 10.1016/j.neuroimage.2010.10.008 Source: PubMed, 31 pages.
U.S. patent application entitled, "Techniques for Separating Driving Emotion From Media Induced Emotion in a Driver Monitoring System", U.S. Appl. No. 16/820,533, filed Mar. 16, 2020, 45 pages.
Huang et al., "Moment-to-Moment Detection of Internal Thought during Video Viewing from Eye Vergence Behavior", MM '19, Oct. 21-25, 2019, Nice, France, DOI: https://doi.org/10.1145/3343031.3350573, 9 pages.

* cited by examiner

*Primary Examiner* — Mishawn N. Hunter
(74) *Attorney, Agent, or Firm* — Artegis Law Group, LLP

(57) ABSTRACT

Embodiments of the present disclosure sets forth a computer-implemented method for playing back media content comprising determining, based on sensor data, a first mental state associated with a user accessing media content, and modifying playback of media content based on the first mental state.

20 Claims, 6 Drawing Sheets

MODIFYING MEDIA CONTENT PLAYBACK
BASED ON USER MENTAL STATE

BACKGROUND

Field of the Various Embodiments

The various embodiments relate generally to psycho-physiological sensing systems and, more specifically, to modifying media content playback based on user mental state.

Description of the Related Art

A user can split his or her focus between multiple tasks when interacting with a given environment. In various environments, a user can perform a primary task, such as driving a vehicle, working, exercising, etc., while simultaneously performing a secondary task, such as consuming media content. In certain situations, the primary task requires heightened attention that can reduce the user's ability to focus on the secondary task. For example, when a user focuses on driving a vehicle to navigate a complex driving situation, the user could miss all or a portion of media content that is being consumed as a secondary task.

Some multimedia systems permit users to rewind media content by fixed time increments (e.g., 15 second increments). A user who misses all or a portion of media content can manually rewind the media content by the fixed time increments. However, rewinding by fixed time increments can be inaccurate, as such rewinding does not account for the actual amount of time missed when a user is distracted from consuming media content. Typically, a user will wish to rewind media content to the point at which the user began missing the media content. However, manually identifying the right amount of time to rewind can be difficult and require multiple tries and/or overshoots by the user.

As the foregoing illustrates, improved techniques for modifying media content playback after a user becomes distracted would be useful.

SUMMARY

One embodiment sets forth a computer-implemented method for playing back media content. The method includes determining, based on sensor data, a first mental state metric associated with a user accessing media content. The method further includes modifying playback of the media content based on the first mental state metric.

Further embodiments provide, among other things, a method and a system configured to implement the computer-readable storage medium set forth above.

At least one technical advantage of the disclosed techniques relative to the prior art is that the disclosed techniques can rewind and replay, or pause and resume, media content based on the determined mental state of a user. Relative to conventional techniques that rewind media content by fixed time increments, the disclosed techniques can more accurately rewind media content to a point in time when the user becomes distracted from consuming the media content. In addition, the disclosed techniques can automatically pause playback of media content when the user becomes distracted from consuming the media content, and resume the playback when the user is no longer distracted. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
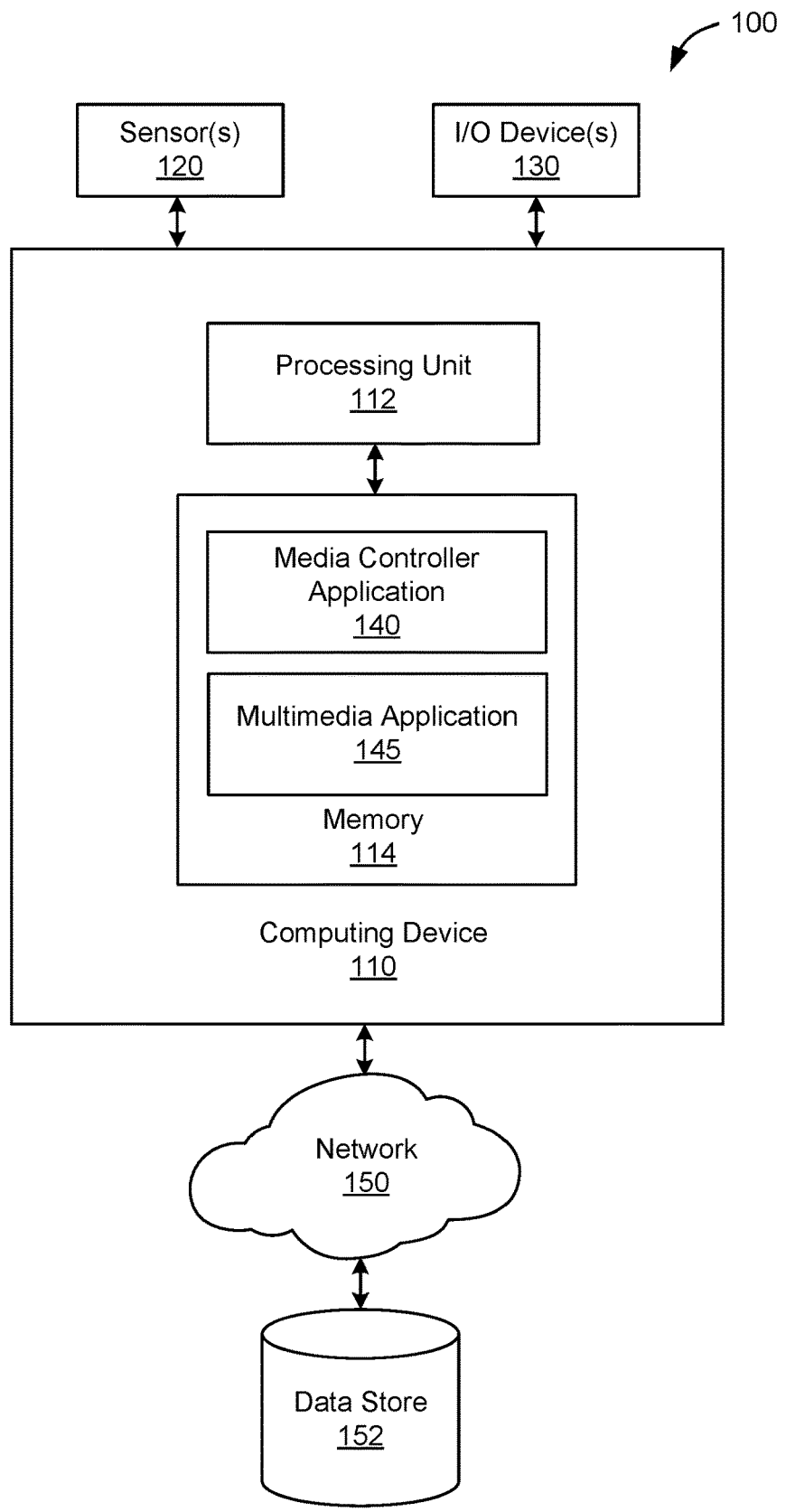
FIG. 1 illustrates a block diagram of a system configured to implement one or more aspects of the present disclosure.

FIG. 1 illustrates a block diagram of a system 100 configured to implement one or more aspects of the present disclosure. As shown, the system 100 includes, without limitation, computing device 110, sensor(s) 120, input/output (I/O) device(s) 130, and network 150. The computing device 110 includes a processing unit 112 and a memory 114. The computing device 110 can be a device that includes one or more processing units 112, such as a system-on-a-chip (SoC). In various embodiments, the computing device 110 may be a mobile computing device or a head unit included in a vehicle system. The embodiments disclosed herein contemplate any technically-feasible system configured to implement the functionality of the system 100 via the computing device 110. Various examples of the computing device 110 include mobile devices (e.g., cellphones, tablets, laptops, etc.), wearable devices (e.g., watches, rings, bracelets, headphones, etc.), consumer products (e.g., gaming, gambling, etc.), smart home devices (e.g., smart lighting systems, security systems, digital assistants, etc.), communications systems (e.g., conference call systems, video conferencing systems, etc.), and so forth. Computing device 110 may be located in various environments including, without limitation, road vehicle environments (e.g., consumer car, commercial truck, etc.), aerospace and/or aeronautical environments (e.g., airplanes, helicopters, spaceships, etc.), nautical and submarine environments, and so forth.

Processing unit 112 may include one or more central processing units (CPUs), digital signal processing units (DSPs), microprocessors, application-specific integrated circuits (ASICs), neural processing units (NPUs), graphics processing units (GPUs), field-programmable gate arrays (FPGAs), a combination thereof, and so forth. The processing unit 112 generally comprises one or more programmable processors that execute program instructions to manipulate input data. In some embodiments, the processing unit 112 may include any number of processing cores, memories, and other modules for facilitating program execution.

The memory 114 can include a memory module or collection of memory modules. The memory 114 generally includes storage chips such as random access memory (RAM) chips that store application programs and data for processing by the processing unit 112. In various embodiments, memory 114 may include non-volatile memory, such as optical drives, magnetic drives, flash drives, or other storage. In some embodiments, separate data stores, such as data store 152 accessible via the network 150 ("cloud storage") may supplement memory 114.

As shown, the memory 114 stores a media controller application 140 and a multimedia application 145. In operation, the processing unit 112 executes the media controller application 140 and the multimedia application 145. As discussed in greater detail below, the media controller application 140 receives and processes sensor data from the sensor(s) 120 to determine the value of a mental state metric associated with a user. In some embodiments, the mental state metric can represent a cognitive load associated with the brain activity that the user is employing, an emotional load associated with an emotional state of the user, an amount of mind wandering by the user, or any combination thereof. The media controller application 140 controls playback of media content by the multimedia application 145 based on such a mental state metric.

In some embodiments, the media controller application 140 can control playback of media content based on a determined mental state metric by (1) storing a playback time when the mental state metric begins satisfying a threshold and optionally when the mental state metric stops satisfying the threshold, and (2) rewinding and replaying the media content from the playback time when the mental state metric begins satisfying the threshold, either automatically after the mental state metric stops satisfying the threshold or in response to a user request. For example, the playback times could be stored as time codes (e.g., timestamps and/or time indexes within the media content), along with any other suitable metadata (e.g., metadata about a file name and/or URL that is associated with and/or otherwise identifies the media content), in the memory 114 of the computing device 110 or elsewhere (e.g., in the data store 152 accessible via the network 150). After rewinding to the playback time when the mental state metric begins satisfying the threshold, the media content can be played again from either a buffer that stores a portion of the media content between the two stored playback times, or from a file that stores the media content. For example, in the case of a live broadcast, the media controller application 140 can store a portion of the live broadcast that is between the times when the mental state metric begins to satisfy the threshold and when the mental state metric stops satisfying the threshold in a buffer. In such a case, when playback of the live broadcast is resumed, the media controller application 140 can play back from the buffer or temporally compress the playback from the buffer, while continuing to buffer the live broadcast, until the playback is in synch with a current time of the live broadcast and playback can be switched to the un-buffered live broadcast, as discussed in greater detail below.

In other embodiments, the media controller application 140 can control playback of media content based on the determined mental state of a user by pausing playback of the media content when a mental state metric satisfies a threshold and resuming playback of the media content when the mental state metric no longer satisfies the threshold. In some embodiments, a user may have the option of enabling or disabling control of the playback of the media content based on mental state.

The multimedia application 145 can be any technically-feasible application that is capable of playing back media content. As used herein, media content can include audio and/or video content. For example, the multimedia application 145 could be a conventional media player application. Although shown as being distinct from the multimedia application 145, in some embodiments, functionality of the media controller application 140 can be included in the multimedia application 145, or vice versa.

As described, the sensor(s) 120 can include one or more devices that perform measurements and/or acquire data that can be used to determine a mental state metric associated with a user. In various embodiments, the sensor(s) 120 may generate sensor data that is related to the cognitive load, emotional load, an amount of mind wandering, and/or any combination thereof experienced by a user. For example, the sensor(s) 120 could collect biometric data related to the user (e.g., heart rate, respiratory behavior, brain activity, skin conductance, blood oxygenation, pupillometry, eye gaze fixations and eye gaze saccades, galvanic skin response, blood-pressure level, average blood glucose concentration, etc.). Additionally or alternatively, the sensor(s) 120 can generate sensor data related to objects in the environment that are not the user. For example, the sensor(s) 120 could generate sensor data about the operation of a vehicle (e.g., foot pedal position, steering wheel position, etc.), including objects around the vehicle, speed of the vehicle, ambient temperature in the vehicle, amount of light within the vehicle, and so forth. In some embodiments, the sensor(s) 120 may be coupled to and/or included within the computing device 110.

In some embodiments, the sensor(s) 120 can acquire data that media controller application 140 processes in order to compute a cognitive load that a user is experiencing as a mental state metric. For example, the sensor(s) 120 could include a pupil sensor (e.g., a camera focused on the eyes of the user) that acquires image data about at least one pupil of a user. The media controller application 140 could then perform various pupillometry techniques, such as time-series-based techniques using time series wavelet transforms, that detect eye parameters (e.g., fluctuations in the user's pupil diameter, direction of the pupil is gazing, eye lid position, etc.) and estimate a cognitive load of the user based on the eye parameters. As another example, the media controller application 140 could feed the image data into a machine learning model that has been trained to classify a cognitive load, emotional load, and/or amount of mind wandering by analyzing eye saccades and fixations, blink rate duration, and/or other parameters. As yet another example, the sensor(s) 120 could include heart rate sensors and/or other biometric sensors that acquire biological and/or physiological signals of the user (e.g., heart rate, breathing rate, eye motions, GSR, neural brain activity, etc.). In such cases, the media controller application 140 could compute the cognitive load being experienced by a user from one or more of the acquired biological and/or physiological signals.

In some embodiments, the sensor(s) 120 may acquire sensor data that the media controller application 140 processes in order to determine an emotional load that a user is experiencing as a mental state metric. Emotional load can be defined and computed in various ways. In some embodiments, emotional parameterized metrics associated with different aspects of emotion can be computed, such as an emotional valence metric representing a positive or negative emotion, an emotional arousal metric representing an intensity of the emotion, and/or an emotional dominance metric representing a level of emotional control. The parameterized metrics can then be combined to determine an emotional load experienced by a user. For example, the sensor(s) 120 could include sensors that acquire biological and/or physiological signals of a user (e.g., perspiration, heart rate, heart-rate variability (HRV), blood flow, blood-oxygen levels, breathing rate, galvanic skin response (GSR), sounds created by a user, behaviors of a user, etc.). In such a case, the media controller application 140 could compute one or more quantitative emotional parameterized metrics based on the sensor data in order to determine an emotional load the user is experiencing. Examples of determining emotional load using parameterized metrics are described further in United States Patent Application entitled "Techniques for Separating Driving Emotion from Media Induced Emotion in a Driver Monitoring System," filed on Mar. 16, 2020 and having Ser. No. 16/820,533, which is incorporated by reference herein in its entirety. In other embodiments, discrete classifications of emotions (e.g., joy, anger, sadness, etc.) can be made using, e.g., a machine learning model. For example, the sensor(s) 120 could include a user-facing camera that records the face of a user in image data. In such a case, the media controller application 140 could analyze the image data using a machine learning model (or otherwise) to determine a facial expression of the user, and then map the facial expression to a specific emotion. In yet further embodiments, the media controller application 140 may perform various voice tone analyses on audio data recorded via acoustic sensors (e.g., a microphone) to determine the emotional load experienced by a user. For example, when a user begins speaking on a telephone call, the media controller application 140 could determine that the user is distracted from consuming media content. As another example, the media controller application 140 could detect a high emotional load (or cognitive load) in the voice of a user who is speaking, indicating that the user is likely to be distracted from consuming media content.

In some embodiments, the sensor(s) 120 may acquire data that the media controller application 140 processes in order to compute an amount of mind wandering that a user is experiencing as a mental state metric. Similar to the cognitive load computation described above, the amount of mind wandering can be determined based on, e.g., pupil sensor data or other data using time-series-based techniques, machine learning techniques, etc. In some embodiments, the amount of mind wandering experienced by a user may be determined by comparing an amount that eye saccades and fixations of the user have changed, relative to a baseline for the user. In some embodiments, fewer eye saccades than the baseline could be detected, indicating that the user is staring. In some embodiments, more eye saccades than the baseline could be detected, indicating that the user is daydreaming. In other embodiments, mind wandering may be identified when the eye vergence of a user goes to infinity, i.e., the eye gaze angles of the eyes are the same and the eye gaze directions of the eyes are parallel, indicating that the user is focusing very far away. In yet other embodiments, an amount of mind wandered may be determined by identifying certain brain wave patterns in neural activity sensor data, such as electroencephalogram (EEG) data. For example, an increase in theta (4-7 Hz) or delta (2-3.5 Hz) EEG data could be associated with mind wandering.

In some embodiments, sensor data acquired via the sensor(s) 120 can be processed by the media controller application 140 to determine a mental state metric that represents a combination of the cognitive load, emotional load, and/or amount of mind wandering described above. Any technically feasible combination can be computed, such as an additive combination in which a weighted sum of metric values for the cognitive load, emotional load, and/or amount of mind wandering is used as the mental state metric; a machine-learning-based combination in which the metric values for the cognitive load, emotional load, and/or amount of mind wandering are input into a machine learning model that outputs an overall mental state metric; etc.

In determining the mental state metric, the media controller application 140 can also remove a component of the mental state metric that is caused by the media content being consumed. Doing so avoids modifying playback of media content when the media content itself is causing a user to experience a high cognitive load, a high emotional load, and/or a high amount of mind wandering. In some embodiments, the media controller application 140 may determine when a particular value of the mental state metric is caused by environmental factors, as opposed to the media content itself, and disregard the mental state metric in such cases. For example, the media controller application 140 could receive sensor data from cameras, lidar (light detection and ranging), radar, etc. sensor(s) mounted on a vehicle and use such sensor data to identify a complex driving situation that is causing a high cognitive workload. In such a case, the media controller application 140 could determine that the high cognitive workload is not caused by the media content itself. In other embodiments, the media controller application 140 may analyze the media content or associated metadata using, e.g., speech-to-text and/or sentiment analysis, to determine a value of the mental state metric caused by the media content item. In such a case, the media controller application 140 may remove the contribution of (e.g., by subtracting) the mental state metric caused by the media content item from the current value of the mental state metric to determine a value of the mental state metric that is not caused by the media content.

In some embodiments, the sensor(s) 120 may include optical sensors, such as RGB cameras, infrared cameras, depth cameras, and/or camera arrays, which include two or more of such cameras. Other optical sensors may include imagers and laser sensors. In some embodiments, sensor(s) 120 may include physical sensors, such as touch sensors, pressure sensors, position sensors (e.g., an accelerometer and/or an inertial measurement unit (IMU)), motion sensors, and so forth, that register the body position and/or movement of the user. In such instances, media controller application 140 may analyze the acquired sensor data to determine the movement of the user, and then correlate such movement with a cognitive load, emotional load, and/or amount of mind wandering experienced by a user.

In some embodiments, the sensor(s) 120 may include physiology sensors, such as heart-rate monitors, electroencephalography (EEG) systems, radio sensors, thermal sensors, galvanic skin response sensors (e.g., sensors that measure change in electrical resistance of skin caused by emotional stress), contactless sensor systems, magnetoencephalography (MEG) systems, and so forth. In various embodiments, media controller application 140 may execute spectral entropy, weighted mean frequency, bandwidth, and/or spectral edge frequency to determine cognitive load from the acquired sensor data.

In some embodiments, the sensor(s) 120 may include acoustic sensors, such as a microphone and/or a microphone array that acquires sound data. Such sound data may be processed by the media controller application 140 performing various natural language (NL) processing techniques, sentiment analysis, and/or speech analysis in order to determine the semantic meaning of the phrases spoken in the environment and/or infer emotional parameterized metrics from the semantic meaning. In another example, media controller application 140 could analyze the acquired sound data using voice-tone analysis in order to infer an emotional and/or cognitive load from the speech signal included in the sound data. In some embodiments, media controller application 140 may execute various analysis techniques relating to the spectral centroid frequency and/or amplitude of the sound signal in order to determine, from the sound signal, a cognitive load, emotional load, and/or amount of mind wandering experienced by a user.

In some embodiments, the sensor(s) 120 may include environmental sensor(s), such as cameras, thermal imaging sensors, infrared sensors, ultrasound sensors, lidar sensors, radar sensors, vehicle instrument sensors, etc. For example, in the context of driving, sensor data can be acquired via cameras and/or other sensors mounted on a vehicle that are used to detect other vehicles, external events, weather events, etc. The media controller application 140 may estimate cognitive load, emotional load, and/or an amount of mind wandering experienced by a user based on the sensor data acquired by environmental sensors. Returning to the example of driving, the media controller application 140 could determine that a user is experiencing a high cognitive load when the media controller application 140 identifies a complex driving situation or unusual weather based on vehicle sensor data.

In some embodiments, the sensor(s) 120 may include behavioral sensors that detect the activity of the user within the environment. Such behavioral sensors may include devices that acquire related activity data, such as devices that acquire application usage data, mobile device usage data, and/or data associated with user interactions with the environment. In such cases, the media controller application 140 may estimate cognitive load, emotional load, and/or an amount of mind wandering experienced by a user by determining the activities in which the user is currently engaged. For example, a given activity could be classified as being a fun, social activity in which a user engages when happy and active. In such instances, media controller application 140 could correlate the usage of the given application with a pre-defined emotion (e.g., excited) and/or pre-defined emotional parameterized metrics (a high arousal value and a positive valence value). As another example, in the context of driving, the behavior sensors could include various sensors that detect vehicle control inputs, such as how a steering wheel is being turned or gas/brake pedals are being applied. Such sensor data can also be relevant to the cognitive load, emotional load, and/or amount of mind wandering that is being experienced by a user.

The I/O device(s) 130 may include devices capable of receiving input, such as a keyboard, a mouse, a touch-sensitive screen, a microphone and other input devices for providing input data to computing device 110. In various embodiments, the I/O device(s) 130 may include devices capable of providing output, such as a display screen, loudspeakers, and the like. One or more of I/O devices 130 can be incorporated in the computing device 110, or may be external to the computing device 110. In some embodiments, the computing device 110 and/or one or more I/O device(s) 130 may be components of an advanced driver assistance system.

The network 150 may enable communications between computing device 110 and other devices via wired and/or wireless communications protocols, including Bluetooth, Bluetooth low energy (BLE), wireless local area network (WiFi), cellular networks, satellite networks, vehicle-to-vehicle (V2V) networks, and/or near-field communications (NFC). As described, the media controller application 140 can access a remote data store 152 such as cloud storage via the network 150. In some embodiments, the network 150 may also be used to retrieve sensor data (e.g., traffic congestion data, weather data, etc.) from other computer sources. In such cases, the media controller application 140 may also employ the sensor data retrieved via the network 150 to compute the mental state metric that is used to determine whether playback of media content should be modified.

Figure 2:
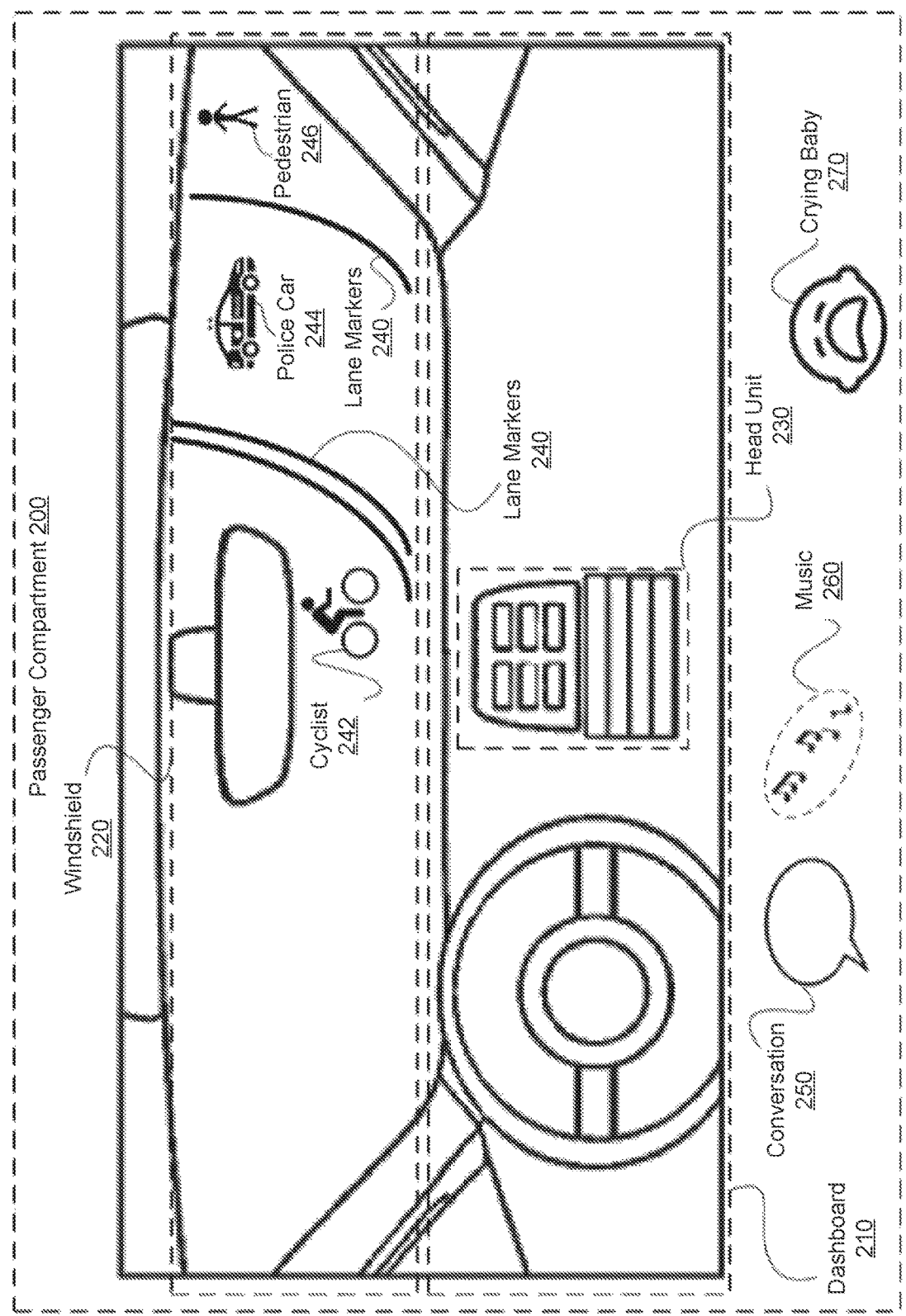
FIG. 2 illustrates a view from a passenger compartment of a vehicle, according to various embodiments.

FIG. 2 illustrates a view of a passenger compartment 200 of a vehicle, according to various embodiments. In some embodiments, passenger compartment 200 may correspond to the environment associated with system 100. As shown, passenger compartment 200 includes, without limitation, a dashboard 210, a windshield 220, and a head unit 230. In various embodiments, the passenger compartment 200 may include any number of additional components that implement any technically-feasible functionality. For example, the passenger compartment 200 could include a rear-view camera (not shown).

As shown, the head unit 230 is located in the center of the dashboard 210. In various embodiments, the head unit 230 may be mounted at any location within the passenger compartment 200 in any technically-feasible fashion that does not block the windshield 220. The head unit 230 may include any number and type of instrumentation and applications, and may provide any number of input and output mechanisms. For example, the head unit 230 could enable users (e.g., the driver and/or passengers) to control entertainment functionality. In some embodiments, the head unit 230 may include navigation functionality and/or advanced driver assistance (ADAS) functionality designed to increase driver safety, automate driving tasks, and so forth.

The head unit 230 supports any number of input and output data types and formats, as known in the art. For example, the head unit 230 could include built-in Bluetooth for hands-free calling and/or audio streaming, universal serial bus (USB) connections, speech recognition, rear-view camera inputs, video outputs for any number and type of displays, and any number of audio outputs. In general, any number of sensors (e.g., the sensor(s) 120), displays, receivers, transmitters, etc., may be integrated into the head unit 230, or may be implemented externally to the head unit 230. In various embodiments, external devices may communicate with the head unit 230 in any technically-feasible fashion.

While driving, a driver of the vehicle is exposed to a variety of stimuli that are related to either a primary task (e.g., guiding the vehicle) and/or any number of secondary tasks. For example, the driver could see, via the windshield 220, lane markers 240, a cyclist 242, a police car 244, and/or a pedestrian 246. In response, the driver could steer the vehicle to track the lane markers 240 while avoiding the cyclist 242 and the pedestrian 246, and then apply the brake pedal to allow police car 244 to cross the road in front of the vehicle. Further, the driver could concurrently or intermittently participate in a conversation 250, listen to music 260, and/or attempt to soothe a crying baby 270, which are examples of secondary tasks. As described, differing driving environments can cause the driver of the vehicle to become distracted and unable to focus on a secondary task such as consuming media content.

The Media Controller Application

Figure 3:
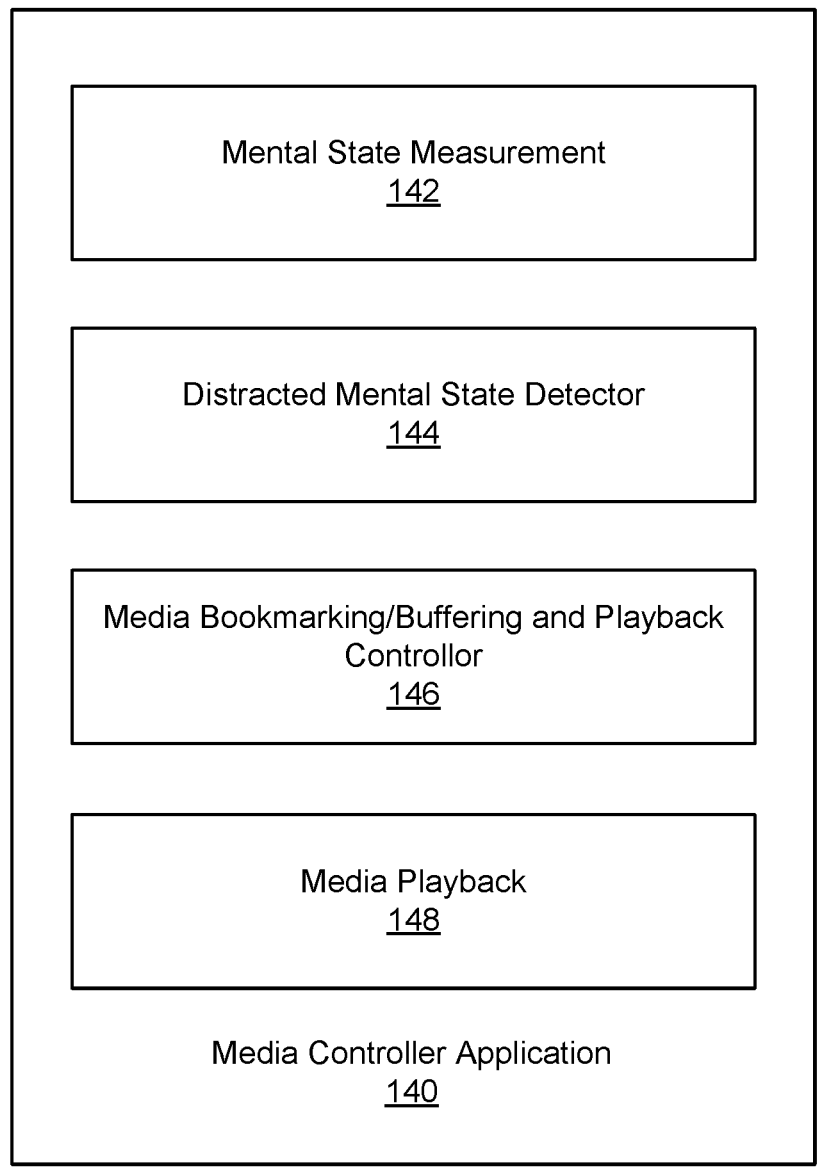
FIG. 3 illustrates in greater detail the media controller application of FIG. 1, according to various embodiments.

FIG. 3 illustrates in greater detail the media controller application 140 of FIG. 1, according to various embodiments. As shown, the media controller application 140 includes a mental state measurement module 142, a distracted mental state event detector module 144, a media bookmarking/buffering and playback controller module 146, and a media playback module 148. The mental state measurement module 142 receives sensor data from the sensor(s) 120 and determines a mental state metric indicative of a cognitive load, emotional load, and/or amount of mind wandering being experienced by the user based on the received sensor data. In embodiments, the mental state measurement module 142 can compute a regression or classification value for the mental state metric. For example, the mental state measurement module 142 could calculate a specific cognitive load value, such as a regression value using pupillometry-based techniques. As another example, the mental state measurement module 142 could use a machine learning classifier to classify the cognitive load experienced by a user as high, medium, or low, or using some other set of classifications.

Given the mental state metric determined by the mental state measurement module 142, the distracted high mental state event detector module 144 identifies periods during which the user may be distracted from consuming media content, such as periods of high cognitive and/or emotional load, or periods with high amounts of mind wandering. In some embodiments, the distracted high mental state event detector module 144 determines when a user is distracted by comparing the mental state metric values computed (continuously or periodically) by mental state measurement module 142 during playback of the media content to a threshold value beyond which the mental state metric is indicative of high cognitive load, high emotional load, and/or a high amount of mind wandering. The distracted mental state detector module 144 then notifies the media bookmarking/buffering module 146 to store the identified playback times as bookmarks.

The media bookmarking/buffering and playback controller module 146 maintains a set of bookmarks indicating the most recent and/or historical playback times when the mental state measurement module 142 determined that the mental state metric satisfied the threshold described above. In some embodiments, the playback times can be stored as time codes, such as timestamps, in the memory 114 of the computing device 110, or elsewhere (e.g., in the data store 152 accessible via the network 150). Any suitable metadata, such as metadata about a file name and/or URL that is associated with the media content, can also be stored in the bookmark. Such metadata may be useful when, e.g., a switch occurs from one media file to another during a period of high cognitive load, high emotional load, and/or a high amount of mind wandering. In some embodiments, the media bookmarking/buffering module 146 can also store portion(s) of media content between the determined times in a buffer for later playback. The buffer can also be located in the memory 114 of the computing device 110 or elsewhere (e.g., in the data store 152).

In some embodiments, the media bookmarking/buffering and playback controller module 146 can, together with the media playback module 148, (1) automatically pause and resume playback of media content based on playback times at which the mental state metric satisfies a threshold and stops satisfying the threshold, which can also optionally be stored in bookmarks; (2) automatically rewind and replay media content from a playback time at which the mental state metric satisfies a threshold, as indicated in a stored bookmark; or (3) handle requests by a user to rewind and replay media content from such a playback time at which the mental state metric satisfies the threshold, as indicated in a stored bookmark.

The media playback module 148 controls multimedia application 145, such as a media player, that accepts either commands to play back media starting from a certain time or a time-shifted media stream from a buffer. In some embodiments, the playback may also include intelligent temporal compression that accelerates playback of the buffered media content. Returning to the example of a live broadcast, if a user is distracted for 20 seconds, then a live audio stream (e.g., news) could be paused during the period of distraction and stored in a buffer. Then, when the user is no longer distracted, the media playback module 148 can read out the stored audio from the buffer and play back the stored audio at faster than normal speed (i.e., compressed). The live audio stream continues to be stored to the buffer, and previously stored audio is simultaneously read out and played back at the faster speed, until the audio catches up to a current time of the live broadcast, at which point the media playback module 148 switches to un-buffered playback of the live audio stream.

In some embodiments, the media controller application 140 may be integrated into a multimedia player such as an audio or video player. In such cases, the media playback module 148 may perform the functionality of the multimedia player.

Figure 4:
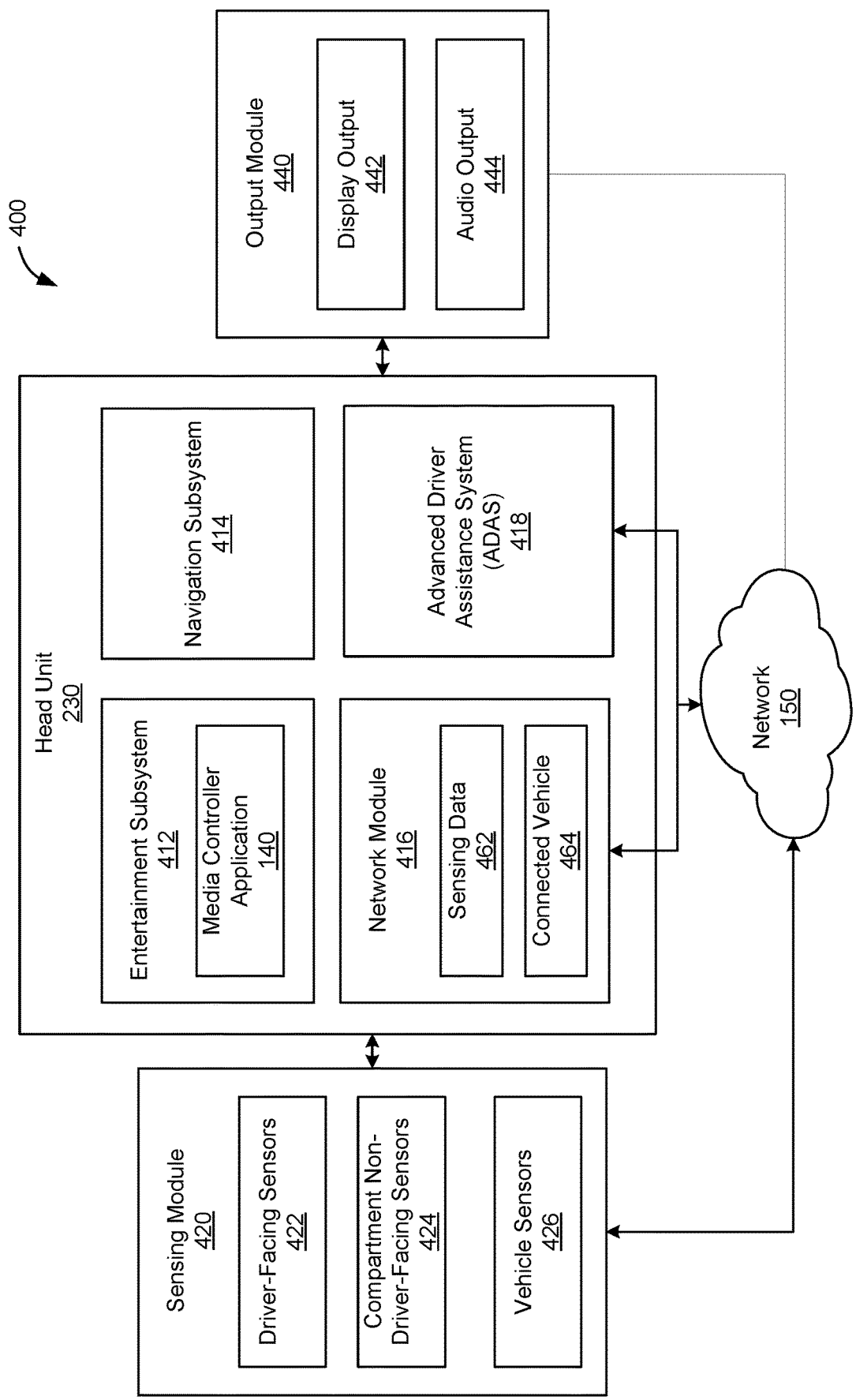
FIG. 4 illustrates an example vehicle system that includes the media controller application of FIG. 1, according to various embodiments.

FIG. 4 illustrates an example vehicle system 400 that includes the media controller application 140 of FIG. 3, according to various embodiments. As shown, the vehicle system 400 includes sensing module 420, head unit 230, network 150, and an output module 440. Sensing module 420 includes driver-facing sensors 422, compartment non-driver facing sensors 424, and vehicle sensors 426. The head unit 230 includes entertainment subsystem 412, navigation subsystem 414, network module 416, and advanced driver assistance system (ADAS) 418. The output module 440 includes a display 442 and a speaker 444.

The sensing module 420 includes multiple types of sensors, including driver-facing sensors 422 (e.g., cameras, motion sensors, etc.), compartment non-driver facing sensors 424 (e.g., motion sensors, pressure sensors, temperature sensors, etc.), and vehicle sensors (e.g., outward-facing cameras, accelerometers, etc.). In various embodiments, sensing module 420 provides a combination of sensor data that describes the context in which a mental state of a user can be observed in more detail.

In various embodiments, vehicle sensors 426 may further include other external sensors. Such external sensors may include optical sensors, acoustic sensors, road vibration sensors, temperature sensors, etc. In some embodiments, sensing module and/or network module 416 may acquire other external data, such as geolocation data (e.g., GNNS systems, including a global positioning system (GPS), Glonass, Galileo, etc.). In some embodiments, navigation data and/or geolocation data may be combined to predict changes to the mental state metric based on expected driving conditions. For example, an expected traffic jam may cause media controller application 140 to predict an increase in the mental state metric upon the vehicle reaching affected area.

The network module 416 receives and transmits data via the network 150. In some embodiments, the network module 416 retrieves sensor data from the sensor module 420. In various embodiments, the network module 416 may retrieve specific values, such as sensing data 462, connected vehicle data 464, and/or historical data (e.g., previous mental state metrics, calculations that were computed by remote devices, etc.).

In some embodiments, network module 416 may transmit data acquired by the head unit 230, such as one or more mental state measurement values, and/or sensing data 462 acquired by the sensor module 420. In such instances, one or more devices connected to the network 150 may merge data received from the network module 416 with data from other vehicles, and/or infrastructure before being consumed by computation modules. For example, one or more devices may accumulate and compile sensing data in order to associate driving conditions with a mental state metric. For example, one or more devices could accumulate multiple mental state metric values computations into an aggregate measure of the focus or engagement of a group, which can in turn be used to calibrate the threshold value that, when satisfied by the mental state metric, indicates that a user is distracted from consuming media content. In some embodiments, baselining can also be performed to personalize such a threshold that is a default to a more appropriate threshold for a particular user. For example, each time a user enters a vehicle, mental state metric values could be computed, and such values could be aggregated over time to determine a baseline for the user and a threshold indicating the particular user is distracted from consuming media content.

Figure 5:
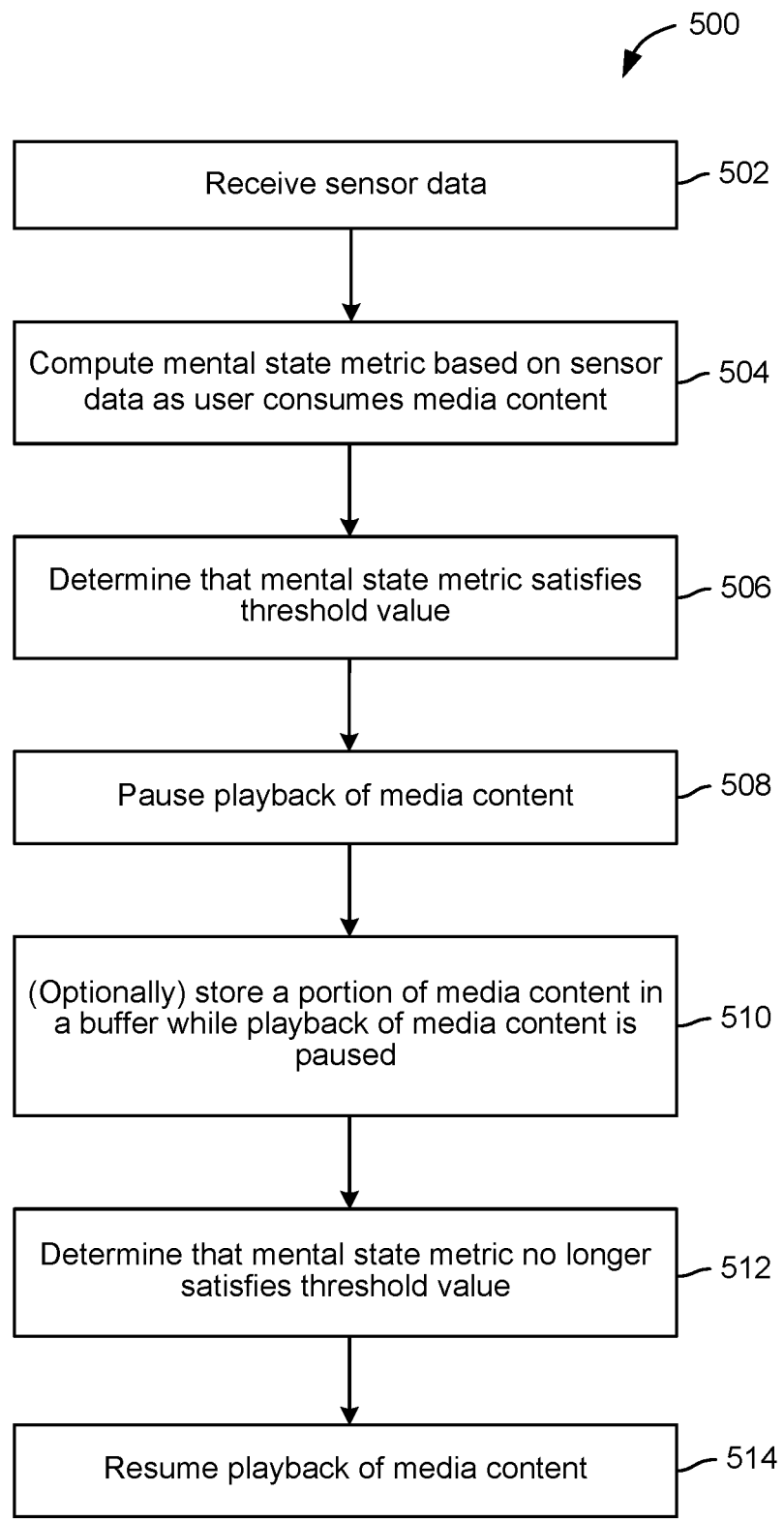
FIG. 5 is a flow diagram of method steps for playing back media content based on a mental state metric, according to various embodiments.

FIG. 5 is a flow diagram of method steps for playing back media content based on a mental state metric, according to various embodiments. Although the method steps are described with respect to the systems of FIGS. 1-4, persons skilled in the art will understand that any system configured to perform the method steps, in any order, falls within the scope of the various embodiments.

As shown, a method 500 begins at step 502, where the media controller application 140 receives sensor data. As described above in conjunction with FIG. 1, various sensor data can be acquired and used to determine a mental state metric indicative of a cognitive load being experienced by a user, an emotional load being experienced by the user, and/or an amount of mind wandering. For example, the sensor data could include biometric data related to the user (e.g., heart rate, respiratory behavior, brain activity, skin conductance, blood oxygenation, pupil size, eye gaze fixations and eye gaze saccades, galvanic skin response, blood-pressure level, average blood glucose concentration, etc.) and/or data related to activities the user is engaging in (e.g., speech that is recorded via acoustic sensors). Additionally or alternatively, the sensor data can include data related to objects in the environment that are not the user.

At step 504, the media controller application 140 computes a mental state metric based on the sensor data as a user is consuming media content. The media controller application 140 can compute the mental state metric continuously or at periodic intervals (e.g., every second) while the user consumes the media content.

In some embodiments, the media controller application 140 computes the mental state metric by analyzing relevant portions of the sensor data and estimating a user's cognitive load, emotional load, amount of mind wandering, or any combination thereof that is not caused by the media content itself. For example, as described above in conjunction with FIG. 1, the media controller application 140 could perform various pupillometry techniques on received image data to determine fluctuations in a pupil of the user that are indicative of cognitive load and/or an amount of mind wandering. In particular, the media controller application 140 can employ various time-series or machine learning based techniques to determine the cognitive load and/or amount of mind wandering experience based on the pupil fluctuation data. As another example, media controller application 140 could determine an amount of mind wandering by comparing an amount that eye saccades and fixations of a user change relative to a baseline, identifying when eye vergence goes to infinity, and/or identifying certain brain wave patterns in neural activity sensor data. As yet another example, the media controller application 140 could determine an emotional load of the user based on facial expressions, visual cues, voice tone and other audio cues, physiological signals, etc. extracted from the sensor data. For example, the media controller application 140 could perform various facial expression estimation techniques on received image data in order to determine a particular emotion being experienced by the user or parameterized arousal and valence values in an emotional load metric. The media controller application 140 can also combine estimates of the user's cognitive load, emotional load, and/or amount of mind wandering. For example, in some embodiments, an additive or machine-learning-based combination may be used.

As described, a component of the mental state metric that is caused by the media content itself can also be removed. In some embodiments, the media controller application 140 may determine that a value of the mental state metric is caused by the environment, as opposed to the media content itself, based on sensor data. In other embodiments, the media controller application 140 may analyze the media content or associated metadata to determine a value of the mental state metric caused by the media content at various times. In such cases, the media controller application 140 can subtract the value of the mental state metric caused by the media content from the current value of the mental state metric to determine a value of the mental state metric that is not caused by the media content.

At step 506, the media controller application 140 determines that the mental state metric satisfies a threshold. As described, the threshold is a value that, when satisfied (e.g., exceeded), indicates that the user is experiencing a high cognitive load, a high emotional load, and/or a high amount of mind wandering. In some embodiments, baselining may be performed to personalize a default threshold to a more accurate threshold for a particular user. For example, if the mental state metric indicates a cognitive load experienced by the user, the media controller application 140 could determine that a value of the mental state metric exceeds a threshold indicating the user is unable to focus on consuming media content. As another example, if the mental state metric indicates an emotional load, the media controller application 140 could determine that a value of the mental state metric exceeds a threshold indicating the user is experiencing a high level of emotion, which could distract the user from consuming media content. As yet another example, if the mental state metric indicates a high amount of mind wandering, the media controller application 140 could determine that a value of the mental state metric exceeds a threshold indicating that the user's mind is wandering too much to focus on media content being consumed. In addition, the mental state metric may include a combination of cognitive load, emotional load, and/or amount of mind wandering, in which case the combination exceeding a threshold could indicate that the user is unable to focus on media content being consumed.

Although described herein primarily with respect to a threshold, in alternative embodiments, the media controller application 140 may determine that playback of media content should be paused, resumed, or otherwise modified based on a mental state metric without using a threshold. For example, assume that the mental state metric is determined using a machine learning classifier and indicates one of a low, medium, or high cognitive load. In such a case, the media controller application 140 could pause the media content when the machine learning classifier outputs a high cognitive load value.

At step 508, the media controller application 140 pauses playback of the media content. In some embodiments, the media controller application 140 can control the multimedia application 145 to pause playback of the media content. In other embodiments, the media controller application 140 may be included as part of the multimedia application 145 and directly pause playback of the media content.

At step 510, the media controller application 140 optionally stores a portion of the media content in a buffer while playback of the media content is paused. For example, the media content could be a live broadcast. In such a case, the media controller application 140 could store a portion of the live broadcast during the period of distraction (and after the period of distraction until playback catches up to a current time of the live broadcast) in a buffer for later playback, so that the user does not miss any of the live broadcast.

At step 512, the media controller application 140 determines that the mental state metric no longer satisfies the threshold. Then, at step 514, the media controller application 140 resumes playback of the media content. The media controller application 140 can control the multimedia application 145 to resume playback of the media content in some embodiments. In other embodiments, the media controller application 140 may be included as part of the multimedia application 145, in which case the media controller application 140 can directly resume playback of the media content. In alternative embodiments, the media controller application 140 can resume playback of the media content based on the mental state metric without comparing the mental state metric to a threshold, similar to the discussion above in conjunction with step 506.

In some embodiments, playback of the media content can be resumed from the buffer in which a portion of the media content is stored. Returning to the example of a live broadcast, the media controller application 140 could resume playback of the live broadcast from a buffer that stores a portion of the live broadcast beginning from when the live broadcast was paused. In such a case, the media controller application 140 can also temporally compress playback of the stored content from the buffer, while continuing to store the live broadcast in the buffer, until the playback is in synch with a current time of the live broadcast, at which point the media controller application 140 switches to un-buffered playback of the live broadcast.

Figure 6:
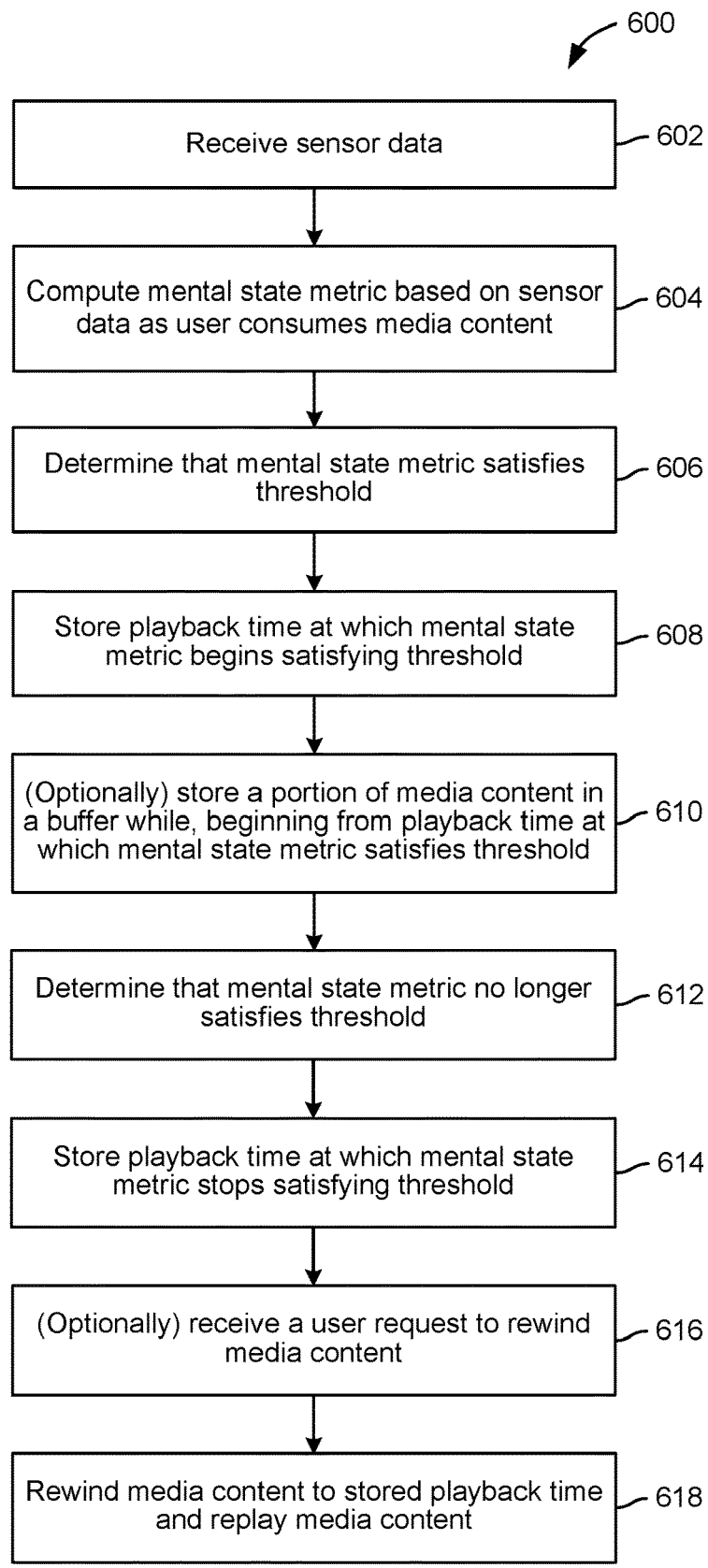
FIG. 6 is a flow diagram of method steps for playing back media content based on a mental state metric, according to various other embodiments.

FIG. 6 is a flow diagram of method steps for playing back media content based on a mental state metric, according to alternative embodiments. Although the method steps are described with respect to the systems of FIGS. 1-4, persons skilled in the art will understand that any system configured to perform the method steps, in any order, falls within the scope of the various embodiments.

As shown, a method 600 begins at step 602, where the media controller application 140 receives sensor data. Similar to step 502 of the method 500 described above in conjunction with FIG. 5, various sensor data can be acquired and used to determine a mental state metric indicative of the cognitive load being experienced by a user, the emotional load being experienced by the user, and/or an amount of mind wandering by the user.

At step 604, the media controller application 140 computes a mental state metric based on the sensor data as a user is consuming media content. Similar to step 504 of the method 500 described above in conjunction with FIG. 5, the media controller application 140 can compute the mental state metric by analyzing relevant portions of the sensor data and estimating a user's cognitive load, emotional load, amount of mind wandering, or a combination thereof that is not caused by the media content itself. In some embodiments, a component of the mental state metric that is caused by the media content itself can be removed by analyze the media content or associated metadata, determining based on sensor data whether environmental conditions are causing a particular value of the mental state metric, etc.

At step 606, the media controller application 140 determines that the mental state metric satisfies a threshold. Step 606 is similar to step 506 of the method 500 described above in conjunction with FIG. 5. Then, at step 608, the media controller application 140 stores the playback time at which the mental state metric begins satisfying the threshold. In some embodiments, the media controller application 140 can store the playback time and any associated metadata in a bookmark, as described above in conjunction with FIG. 3. In contrast to step 508 of the method 500 described above in conjunction with FIG. 5, the media controller application 140 does not pause the media content. In alternative embodiments, the media controller application 140 may store a playback time based on the mental state metric without comparing the mental state metric to a threshold. For example, similar to the discussion above in conjunction with step 506 of the method 500, the media controller application 140 could store the playback time when a machine learning classifier classifiers a user's cognitive load as being high.

At step 610, the media controller application 140 optionally stores a portion of the media content in a buffer, beginning from the playback time at which the mental state metric satisfies the threshold. As described, the media content could be, e.g., a live broadcast, in which case the media controller application 140 may store a portion of the live broadcast in a buffer for later playback so that the user does not miss any of the live broadcast.

At step 612, the media controller application 140 determines that the mental state metric no longer satisfies the threshold. Then, at step 614, the media controller application 140 stores another playback time at which the mental state metric stops satisfying the threshold. Similar to step 608, the media controller application 140 can store the other playback time and any associated metadata in a bookmark. In alternative embodiments, the media controller application 140 can store the other playback time without comparing the mental state metric to a threshold, similar to the discussion above in conjunction with step 506 of the method 500. For example, the media controller application 140 could store a playback time when a machine learning model classifies the user's cognitive load as being low or medium.

At step 616, the media controller application 140 optionally receives a user request to rewind the media content. For example, the user could realize that he or she has missed a portion of the media content being consumed and request to rewind the media content. The user can request to rewind the media content in any technically feasible manner. For example, the media controller application 140 could provide a graphical user interface that includes a button for rewinding the media content. As another example, the media controller application 140 could accept verbal or gestural commands to rewind the media content. In some embodiments, the media controller application 140 may also notify the user (e.g., via a displayed notification or an audio notification) of the option to rewind the media content to the playback time stored at step 808.

At step 618, the media controller application 140 rewinds the media content to the playback time stored at step 608 and plays the media content again. In some embodiments, the media controller application 140 can control the multimedia application 145 to rewind and replay the media content. In other embodiments, the media controller application 140 may be integrated into the multimedia application 145 and directly able to rewind and replay the media content.

In some embodiments, rewinding and replaying the media content can include playing a portion of the media content stored in a buffer. Returning to the example of a live broadcast, the media controller application 140 could play a stored portion of the live broadcast, beginning from the time at which the mental state metric satisfies the threshold. In such a case, after the mental state metric stops satisfying the threshold, the media controller application 140 can temporally compress playback of the stored content from the buffer, while continuing to store the live broadcast in the buffer, until the playback is in synch with a current time of the live broadcast, at which point the media playback module 148 switches to un-buffered playback of the live broadcast.

Although described herein primarily with respect to driving as a reference example, techniques disclosed herein are also applicable to other situations in which a user is consuming media content as a secondary task while performing a primary task. For example, the primary task could be working, exercising, housekeeping, boating, etc. In such cases, a media controller application could determine a mental state metric associated with the user and modify playback of media content based on the mental state metric. For example, a user exercising outdoors could experience a high cognitive and/or emotional load due to a passing vehicle. In such a case, a media controller application, running in a mobile device carried by the user or a wearable device worn by the user, could identify the high cognitive and/or emotional load based on sensor data (e.g., heart-rate monitor data, EEG data, etc.). Then, the media controller application could modify playback of media content that the user is consuming by, e.g., rewinding and replaying a portion of media content or pausing and resuming the media content at a later time when the user's cognitive and/or emotional load decreases.

Although described herein primarily with respect to media content that is played without interruptions, in other embodiments, a media controller application may also account for interruptions in playback of media content. For example, a user who is parking a vehicle may experience a high cognitive and/or emotional load, which can be reflected in the mental state metric computed by the media controller application 140, that distracts the user from consuming media content. In addition, playback of the media content could stop after the vehicle is parked and turned off. In such a case, the media controller application 140 can store (1) a playback time associated with the mental state metric satisfying a threshold indicating that the user is distracted, and (2) another playback time when playback of the media content was interrupted due to the vehicle being turned off. Thereafter, when the user turns the vehicle back on, the media controller application 140 can begin playing the media content again from the time at which the mental state metric exceeded the threshold, assuming a current value of the mental state metric does not exceed the threshold. However, if the current value of the mental state metric exceeds the threshold, then the media controller application 140 can wait until the metal state metric falls below the threshold before playing the media content again.

Although described herein primarily with respect to the media controller application 140 that runs in a single computing device 110, in other embodiments, modifications to playback of media content can be enabled by multiple applications, which can run in different computing devices. For example, techniques disclosed herein can be applied to modify playback of media content when the media content is "handed off" between different playback devices, such as when media content being played via a vehicle entertainment system is handed off to a home entertainment system after a user arrives home. In such a case, playback time(s) when a mental state metric associated with the user satisfied and/or stopped satisfying a threshold, and/or a portion of media content between such playback times, can be stored by a vehicle media controller application at an external location, such as the data store 152 that is accessible via network 150. Then, another media controller application in the home entertainment system can retrieve the stored playback time(s) and/or portion of media content and either rewind and replay, or resume playback of, the media content using the playback time(s) and/or portion of media content.

In sum, a media controller application receives sensor data and modifies playback of media content based on the mental state of a user who consumes the media content while performing another task within an environment. In embodiments, various sensors acquire sensor data associated with the user and/or the environment and send the sensor data to the media controller application. The media controller application determines, from the sensor data, a metric indicative of a mental state associated with the user. The mental state metric may indicate a cognitive load being experienced by the user, an emotional load being experienced by the user, an amount of mind wandering by the user, or any combination thereof. Upon computing the mental state metric, the media controller application analyzes the mental state metric to determine whether playback of the media content should be modified to account for the mental state of the user. In some embodiments, playback of the media content can be modified by (1) pausing playback of the media content when the mental state metric satisfies a threshold, and (2) resuming playback of the media content when the mental state metric no longer satisfies the threshold. In other embodiments, playback of media content can be modified by (1) storing the playback times at which the mental state metric begins to satisfy a threshold and stops satisfying the threshold, and (2) rewinding and replaying the media content based on the stored playback times, either automatically or in response to a user request.

At least one technical advantage of the disclosed techniques relative to the prior art is that the disclosed techniques can rewind and replay, or pause and resume, media content based on the determined mental state of a user. Relative to conventional techniques that rewind media content by fixed time increments, the disclosed techniques can more accurately rewind media content to a point in time when the user becomes distracted from consuming the media content. In addition, the disclosed techniques can automatically pause playback of media content when the user becomes distracted from consuming the media content and resume the playback when the user is no longer distracted. These technical advantages represent one or more technological improvements over prior art approaches.

1. In some embodiments, a computer-implemented method for playing back media content comprises determining, based on sensor data, a first mental state metric associated with a user accessing media content, and modifying playback of the media content based on the first mental state metric.

2. The computer-implemented method of clause 1, wherein modifying the playback of the media content comprises rewinding and replaying the media content from a point in time at which the first mental state satisfies a threshold value.

3. The computer-implemented method of clauses 1 or 2, wherein modifying the playback of the media content comprises pausing the playback of the media content in response to the first mental state metric satisfying a threshold value, and resuming the playback of the media content in response to the first mental state metric not satisfying the threshold value.

4. The computer-implemented method of any of clauses 1-3, further comprising storing a portion of the media content from a first time when the first mental state metric satisfies the threshold value, and playing a temporally compressed version of the portion of the media content when the playback of the media content is resumed.

5. The computer-implemented method of any of clauses 1-4, wherein determining the first mental state metric comprises determining a second mental state metric associated with the user accessing the media content, and removing, from the first mental state metric, the second mental state metric.

6. The computer-implemented method of any of clauses 1-5, wherein the first mental state metric comprises at least one of a cognitive load state metric, an emotional load state metric, or an amount of mind wandering metric.

7. The computer-implemented method of any of clauses 1-6, wherein the first mental state metric is determined using a pupillometry-based technique.

8. The computer-implemented method of any of clauses 1-7, wherein the first mental state metric is determined using a machine-learning-based technique.

9. The computer-implemented method of any of clauses 1-8, wherein the media content comprises one of audio content or video content.

10. In some embodiments, one or more computer-readable storage media include instructions that, when executed by one or more processors, cause the one or more processors to play back media content, by performing steps of determining, based on sensor data, a first mental state metric associated with a user accessing media content, and modifying playback of the media content based on the first mental state metric.

11. The one or more computer-readable storage media of clause 10, wherein modifying the playback of the media content comprises rewinding and replaying the media content from a point in time at which the first mental state satisfies a threshold value.

12. The one or more computer-readable storage media of clauses 10 or 11, wherein the rewinding and replaying of the media content is performed in response to a user request.

13. The one or more computer-readable storage media of any of clauses 10-12, the steps further comprising determining the threshold value based on historical mental state data associated with the user.

14. The one or more computer-readable storage media of any of clauses 10-13, wherein modifying the playback of the media content comprises pausing the playback of the media content in response to the first mental state metric satisfying a threshold value, and resuming the playback of the media content in response to the first mental state metric not satisfying the threshold value.

15. The one or more computer-readable storage media of any of clauses 10-14, the steps further comprising storing a portion of the media content from a first time when the first mental state metric satisfies the threshold value, and playing a temporally compressed version of the portion of the media content when the playback of the media content is resumed.

16. The one or more computer-readable storage media of any of clauses 10-15, wherein determining the first mental state metric comprises determining a second mental state metric associated with the user accessing the media content, and removing, from the first mental state metric, the second mental state metric.

17. The one or more computer-readable storage media of any of clauses 10-16, wherein the first mental state metric comprises at least one of a cognitive load state metric, an emotional load state metric, or an amount of mind wandering metric.

18. The one or more computer-readable storage media of any of clauses 10-17, wherein the first mental state metric is determined using at least one of a pupillometry-based technique or a machine-learning-based technique.

19. In some embodiments, a device comprises a memory that includes instructions, and a processor that is coupled to the memory and, when executing the instructions determines, based on sensor data, a first mental state metric associated with a user accessing media content, and modifies playback of the media content based on the first mental state metric.

20. The device of clause 19, wherein the processor, when executing the instructions, further determines a second mental state metric based on data included in the sensor data that is associated with an environment, and removes, from the first mental state metric, the second mental state metric.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for playing back media content, the method comprising:
    acquiring sensor data via one or more sensors that perform measurements related to at least one of a user or an environment of the user;
    determining, based on the sensor data, a first mental state metric associated with the user during playback of media content;
    determining a first component of the first mental state metric that is caused by the user consuming the media content;
    removing the first component of the first mental state metric from the first mental state metric to produce a second component of the first mental state metric; and
    modifying playback of the media content based on the second component of the first mental state metric.

2. The computer-implemented method of claim 1, wherein modifying the playback of the media content comprises:
    rewinding and replaying the media content from a point in time at which the first mental state metric satisfies a threshold value.

3. The computer-implemented method of claim 1, wherein modifying the playback of the media content comprises:
    pausing the playback of the media content in response to the second component of the first mental state metric satisfying a threshold value; and
    resuming the playback of the media content in response to the second component of the first mental state metric not satisfying the threshold value.

4. The computer-implemented method of claim 3, further comprising:
    storing a portion of the media content from a first time when the second component of the first mental state metric satisfies the threshold value; and
    playing a temporally compressed version of the portion of the media content when the playback of the media content is resumed.

5. The computer-implemented method of claim 1, further comprising:
    determining a second mental state metric associated with the environment of the user; and
    modifying playback of the media content based on the second mental state metric.

6. The computer-implemented method of claim 1, wherein the first mental state metric comprises at least one of a cognitive load state metric, an emotional load state metric, or an amount of mind wandering metric.

7. The computer-implemented method of claim 1, wherein the first mental state metric is determined using a pupillometry-based technique.

8. The computer-implemented method of claim 1, wherein the first mental state metric is determined using a machine-learning-based technique.

9. The computer-implemented method of claim 1, wherein the media content comprises one of audio content or video content.

10. One or more non-transitory computer-readable storage media including instructions that, when executed by one or more processors, cause the one or more processors to play back media content, by performing steps of:
    determining, based on sensor data, a first mental state metric associated with a user during playback of media content;
    determining a first component of the first mental state metric that is caused by the user consuming the media content;

removing the first component of the first mental state metric from the first mental state metric to produce a second component of the first mental state metric; and modifying playback of the media content based on the second component of the first mental state metric.

11. The one or more non-transitory computer-readable storage media of claim 10, wherein modifying the playback of the media content comprises rewinding and replaying the media content from a point in time at which the second component of the first mental state metric satisfies a threshold value.

12. The one or more non-transitory computer-readable storage media of claim 11, wherein the rewinding and replaying of the media content is performed in response to a user request.

13. The one or more non-transitory computer-readable storage media of claim 11, the steps further comprising determining the threshold value based on historical mental state data associated with the user.

14. The one or more non-transitory computer-readable storage media of claim 10, wherein modifying the playback of the media content comprises:

pausing the playback of the media content in response to the second component of the first mental state metric satisfying a threshold value; and resuming the playback of the media content in response to the second component of the first mental state metric not satisfying the threshold value.

15. The one or more non-transitory computer-readable storage media of claim 14, the steps further comprising:

storing a portion of the media content from a first time when the second component of the first mental state metric satisfies the threshold value; and playing a temporally compressed version of the portion of the media content when the playback of the media content is resumed.

16. The one or more non-transitory computer-readable storage media of claim 10, the steps further comprising:

determining a second mental state metric associated with an environment of the user; and modifying playback of the media content based on the second mental state metric.

17. The one or more non-transitory computer-readable storage media of claim 10, wherein the first mental state metric comprises at least one of a cognitive load state metric, an emotional load state metric, or an amount of mind wandering metric.

18. The one or more non-transitory computer-readable storage media of claim 10, wherein the first mental state metric is determined using at least one of a pupillometry-based technique or a machine-learning-based technique.

19. A device, comprising:

a memory that includes instructions; and a processor that is coupled to the memory and, when executing the instructions:

determines, based on sensor data, a first mental state metric associated with a user during playback of media content;

determines a first component of the first mental state metric that is caused by the user consuming the media content;

removes the first component of the first mental state metric from the first mental state metric to produce a second component of the first mental state metric; and modifies playback of the media content based on the second component of the first mental state metric.

20. The device of claim 19, wherein the processor, when executing the instructions, further:

determines a second mental state metric based on data included in the sensor data that is associated with an environment; and modifies playback of the media content based on the second mental state metric.

* * * * *